(12) United States Patent
Kumar et al.

(10) Patent No.: US 10,107,297 B2
(45) Date of Patent: Oct. 23, 2018

(54) METHODS AND SYSTEM FOR A TURBOCHARGER

(71) Applicant: General Electric Company, Schenectady, NY (US)

(72) Inventors: Alok Kumar, Bangalore (IN); Raghav Shrikant Kulkarni, Bangalore (IN)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 15/015,206

(22) Filed: Feb. 4, 2016

(65) Prior Publication Data

US 2017/0227013 A1 Aug. 10, 2017

(51) Int. Cl.
| | | |
|---|---|---|
| *F01D 17/10* | (2006.01) | |
| *F01D 17/14* | (2006.01) | |
| *F02B 37/22* | (2006.01) | |
| *F02C 6/12* | (2006.01) | |
| *F04D 17/10* | (2006.01) | |
| *F04D 27/00* | (2006.01) | |
| *F04D 27/02* | (2006.01) | |
| *F04D 29/28* | (2006.01) | |
| *F04D 29/42* | (2006.01) | |
| *F04D 29/46* | (2006.01) | |
| *F04D 29/68* | (2006.01) | |

(52) U.S. Cl.
CPC ....... *F04D 27/0246* (2013.01); *F01D 17/105* (2013.01); *F01D 17/14* (2013.01); *F02B 37/225* (2013.01); *F02C 6/12* (2013.01); *F04D 29/4213* (2013.01); *F04D 29/462* (2013.01); *F04D 29/682* (2013.01)

(58) Field of Classification Search
CPC .. F04D 25/04; F04D 27/0207; F04D 29/4213; F04D 29/685; F04D 27/0246; F04D 29/462; F04D 29/682; F05D 2220/40; F05D 2270/10; F05D 2270/101; F01D 17/105; F01D 17/14; F02B 37/225; F02C 6/12; Y02T 10/144
See application file for complete search history.

(56) References Cited

U.S. PATENT DOCUMENTS

| | | | | |
|---|---|---|---|---|
| 4,930,979 | A | * | 6/1990 | Fisher .................. F04D 29/4213 415/206 |
| 5,724,813 | A | * | 3/1998 | Fenelon .................... F02B 37/10 60/606 |
| 6,648,594 | B1 | | 11/2003 | Horner et al. |
| 2009/0060708 | A1 | * | 3/2009 | Hale ........................ F02C 1/005 415/58.2 |
| 2011/0002770 | A1 | * | 1/2011 | Bywater .................. F02B 37/16 415/1 |
| 2013/0058762 | A1 | | 3/2013 | Ring et al. |
| 2014/0165536 | A1 | * | 6/2014 | Pursifull ................... F01N 3/10 60/274 |

\* cited by examiner

*Primary Examiner* — Brandon Lee
(74) *Attorney, Agent, or Firm* — McCoy Russell LLP (57) ABSTRACT

Various methods and systems are provided for a variable geometry ported shroud for a turbocharger. In one example, a compressor system includes a compressor housing defining an air inlet, a shroud, and a bypass passage, a compressor wheel housed in the compressor housing and surrounded by the shroud, only a single port passing through the shroud and fluidically coupled to the bypass passage, and a ring configured to move axially to adjust a restriction of the port.

20 Claims, 5 Drawing Sheets

METHODS AND SYSTEM FOR A TURBOCHARGER

FIELD

Embodiments of the subject matter disclosed herein relate to a turbocharger coupled to an internal combustion engine.

BACKGROUND

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor or turbine degradation.

BRIEF DESCRIPTION

In an embodiment, a compressor system includes a compressor housing defining an air inlet, a shroud, and a bypass passage, a compressor wheel housed in the compressor housing and surrounded by the shroud, only a single port passing through the shroud and fluidically coupled to the bypass passage, and a ring configured to move axially to adjust a restriction of the port.

In this way, the port passing through the shroud may be opened, closed, or partially opened via positioning of the ring in order to adjust airflow through the compressor wheel. In doing so, compressor efficiency may be increased by allowing recirculation of air from the compressor air inlet to the bypass passage via an open port, improving the surge margin and widening the compressor map, while surge may be mitigated by increasing the flow rate through the compressor via a closed port.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to a variable geometry ported compressor shroud to optimize the trade-off between turbocharger efficiency and avoiding turbocharger surge. Turbocharger surge typically occurs during low compressor flow conditions and relatively high turbine speed, where the turbine rotation continues to pressurize the air downstream of the compressor, leading to high compressor outlet pressure that can cause flow reversal. Turbochargers are operated between a lower limit air flow below which surge occurs and an upper limit air flow above which choke occurs. Frequently, high efficiency operation may occur near the surge margin, and thus even relatively small changes in compressor air flow may push the turbocharger into surge.

Figure 1:
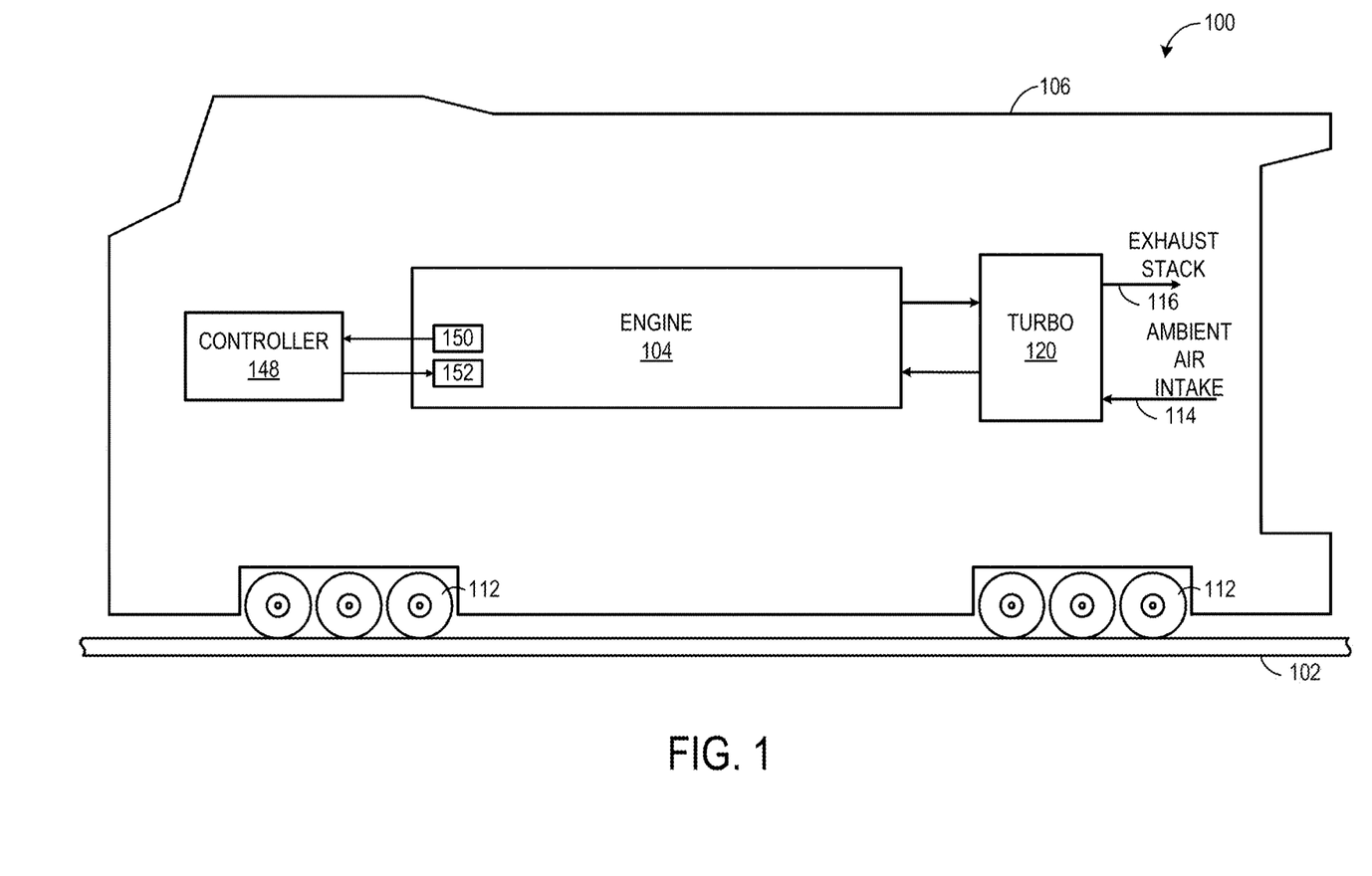
FIG. 1 shows an embodiment of a vehicle system.
Figure 2:
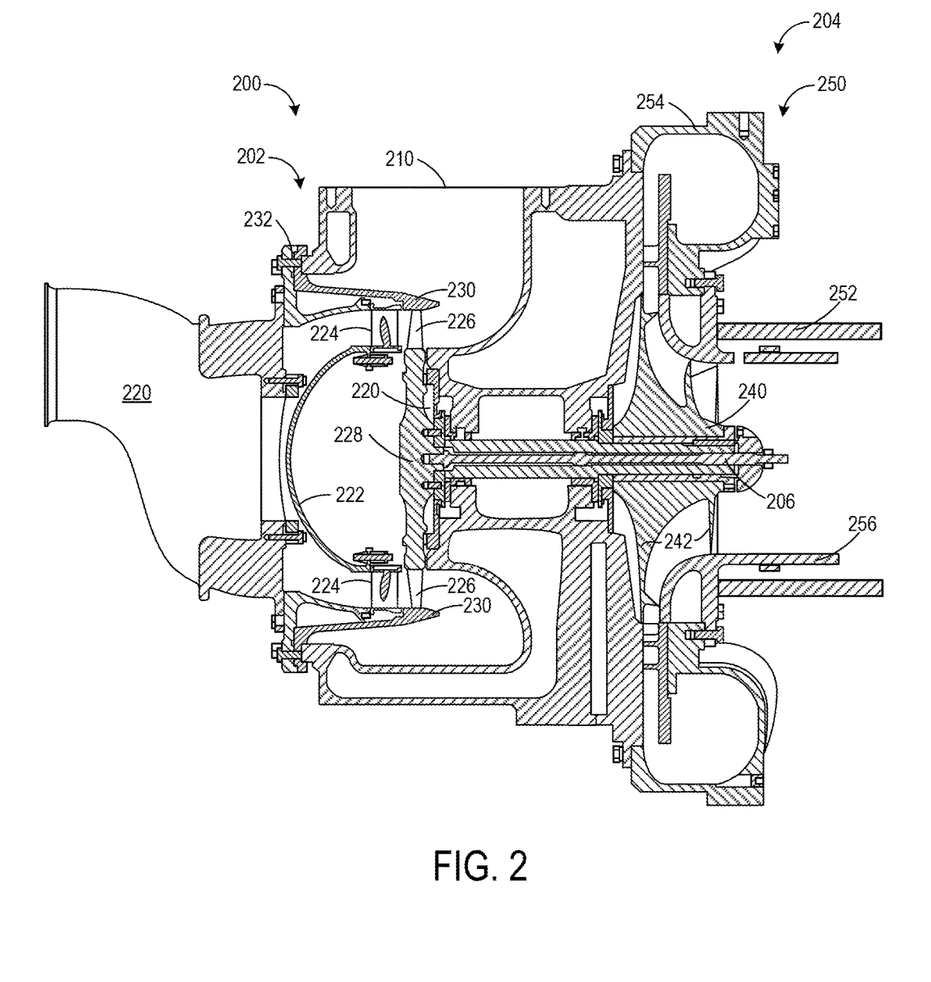
FIG. 2 shows an embodiment of a turbocharger that may be installed in the vehicle system of FIG. 1.
Figure 3:
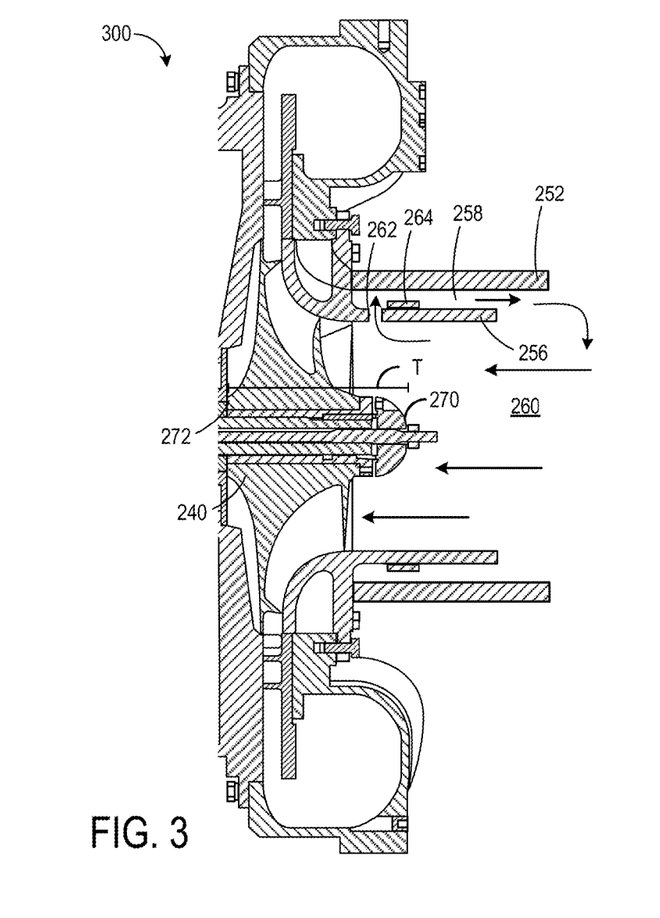
FIGS. 3 and 4 show the compressor stage of the turbocharger of FIG. 2.
Figure 4:
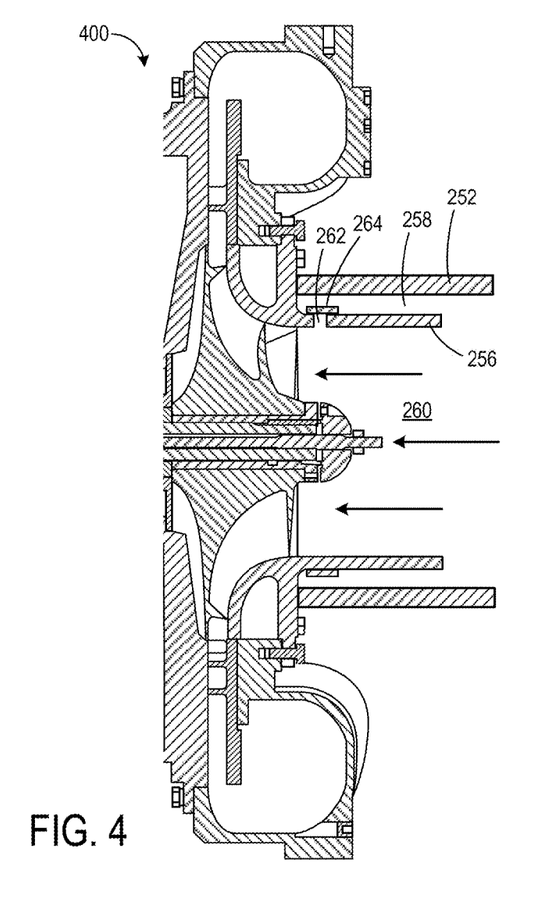
Figure 5:
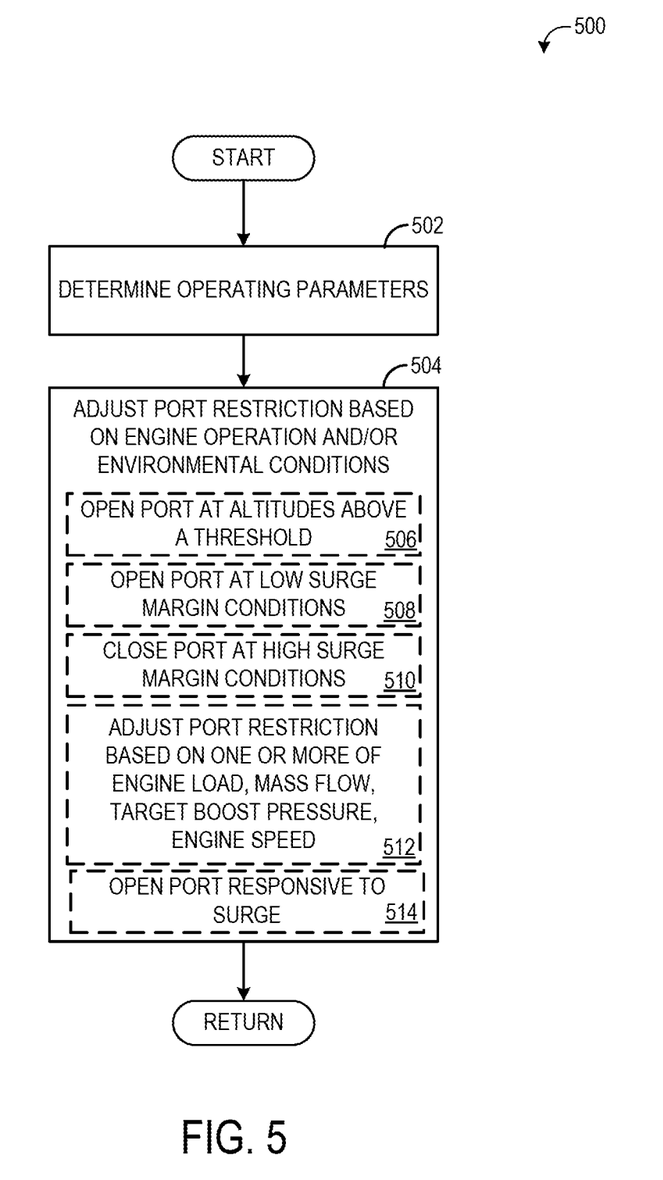
FIG. 5 is a flow chart illustrating a method for operating with a variable geometry ported shroud.
Figure 6:
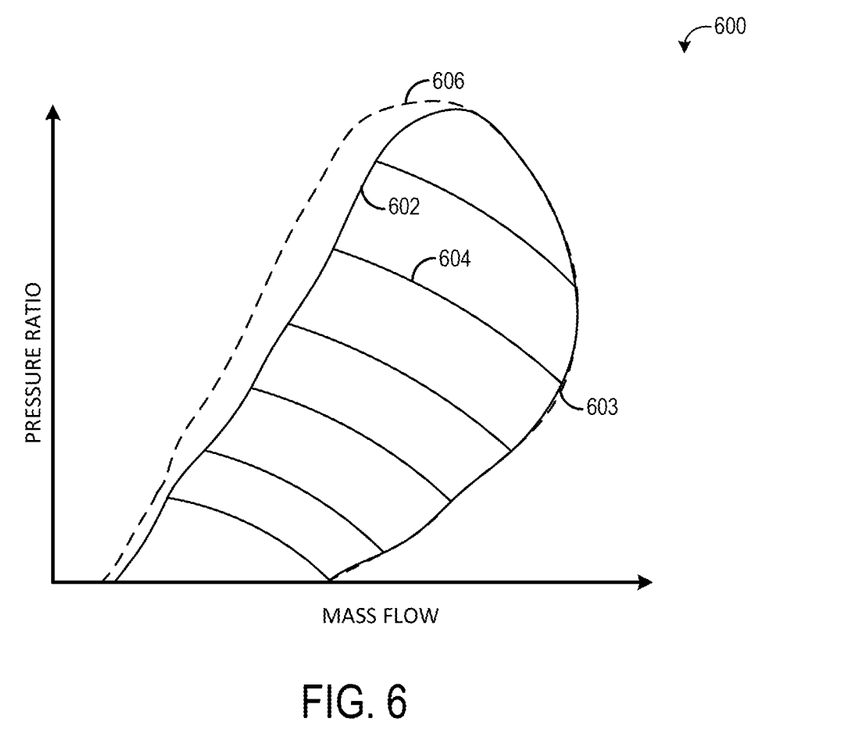
FIG. 6 is an example compressor map.

To mitigate surge, the shroud surrounding the compressor wheel may be ported (e.g., include one more holes or vents through the shroud). The ported shroud recirculates excess airflow to push the surge line back, extending the turbocharger's effectiveness and the range of the engine's power. Further, the restriction of the port in the ported shroud may be adjusted via a ring, sleeve, flap or other valve to allow recirculation to push the surge margin back during certain conditions while closing the port during other conditions to increase compressor efficiency and/or push the compressor out of surge. An example vehicle system including a turbocharger is illustrated in FIG. 1. FIG. 2 illustrates a turbocharger, such as the turbocharger of FIG. 1, including a compressor having a variable geometry ported shroud. FIGS. 3 and 4 illustrate the ported shroud of FIG. 2 in an open position and closed position, respectively. FIG. 5 is a flow chart illustrating a method for operating the turbocharger including the variable geometry ported shroud in order to move the surge margin based on operating conditions. An example compressor map illustrating a surge margin when the variable geometry ported shroud is open versus closed is shown in FIG. 6.

In one embodiment, the turbocharger described above may be coupled to an engine in a vehicle. A locomotive system is used to exemplify one of the types of vehicles having engines to which a turbocharger, or multi-turbocharger, may be attached. Other types of vehicles may include other types of rail vehicles, on-highway vehicles, and off-highway vehicles other than rail vehicles, such as mining equipment and marine vessels. Other embodiments of the invention may be used for turbochargers that are coupled to stationary engines. The engine may be a diesel engine, or may combust another fuel or combination of fuels. Such alternative fuels may include gasoline, kerosene, biodiesel, natural gas, and ethanol. Suitable engines may use compression ignition and/or spark ignition.

FIG. 1 shows a block diagram of an exemplary embodiment of a vehicle system 100, herein depicted as a rail vehicle 106 (e.g., locomotive), configured to run on a rail 102 via a plurality of wheels 112. As depicted, the rail vehicle 106 includes an engine system with an engine 104.

The engine 104 receives intake air for combustion from an intake passage 114. The intake passage 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106.

The engine system includes a turbocharger 120 ("TURBO") that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown in FIG. 1) which is at least partially driven by a turbine (not shown in FIG. 1). While in this case a single turbocharger is shown, the system may include multiple turbine and/or compressor stages. The turbocharger is described in greater detail below with reference to FIG. 2.

In some embodiments, the vehicle system 100 may further include an exhaust gas treatment system coupled in the exhaust passage upstream or downstream of the turbocharger 120. In one example embodiment, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, or various other devices or systems.

The rail vehicle 106 further includes a controller 148 to control various components related to the vehicle system 100. In one example, the controller 148 includes a computer control system. The controller 148 further includes computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, boost pressure, exhaust pressure, ambient pressure, exhaust temperature, turbine speed, etc. Correspondingly, the controller 148 may control the vehicle system 100 by sending commands to various components such as traction motors, alternator, cylinder valves, throttle, etc.

FIG. 2 shows an embodiment of a turbocharger 200 that may be coupled to an engine, such as turbocharger 120 described above with reference to FIG. 1. In one example, the turbocharger may be bolted to the engine. In another example, the turbocharger 200 may be coupled between the exhaust passage and the intake passage of the engine. In other examples, the turbocharger may be coupled to the engine by any other suitable manner.

The turbocharger 200 includes a turbine stage 202 and a compressor 204. Exhaust gases from the engine pass through the turbine stage 202, and energy from the exhaust gases is converted into rotational kinetic energy to rotate a shaft 206 which, in turn, drives a compressor wheel 240 of the compressor 204. Ambient intake air is compressed (e.g., pressure of the air is increased) as it is drawn through the rotating compressor wheel 240 such that a greater mass of air may be delivered to the cylinders of the engine.

The turbocharger includes a casing 210. In some embodiments, the turbine stage 202 and the compressor 204 may have separate casings which are bolted together, for example, such that a single unit (e.g., turbocharger 200) is formed. As an example, the turbocharger may have a casing made of cast iron and the compressor may have a casing made of an aluminum alloy.

Exhaust gas may enter through an inlet, such as gas inlet transition region 220, and pass over a nose piece 222. A nozzle ring 224 may include airfoil-shaped vanes arranged circumferentially to form a complete 360° assembly. The nozzle ring 224 may act to optimally direct the exhaust gas to a turbine disc/blade assembly, including blades 226 and a turbine disc 228, coupled to the shaft 206. In some embodiments, the turbine disc and blades may be an integral component, known as a turbine blisk. The rotating assembly of the turbine, including the turbine disc, blades, and shaft, may collectively be referred to as the turbine rotor. An annular shroud 230 is coupled to the casing at a shroud mounting flange 232 and arranged so as to closely surround the blades 226 and thereby define the flowpath boundary for the exhaust stream flowing through the turbine stage 202. Further, in some examples the turbocharger may be a variable geometry turbocharger including adjustable vanes in the turbine housing at the turbine inlet, for example.

The compressor 204 includes the compressor wheel 240 mounted on the shaft 206. The compressor wheel 240 includes a plurality of blades 242 and is positioned in a compressor housing 250. The compressor housing is coupled to the turbine casing and includes a blower casing 254, air inlet 252, and shroud 256. The air inlet 252 defines a inlet air flow path for intake air to enter the compressor and directs the intake air to the compressor wheel 240. Shroud 256 provides clearance for the compressor blades (e.g., defines the flow path boundary for the intake air stream flowing through the compressor) and may act to absorb any high-speed fragments during a compressor burst condition, for example. As will be explained in more detail below with respect to FIGS. 3 and 4, the shroud 256 includes a variable-geometry port to allow for intake air recirculation in order to mitigate compressor surge.

FIGS. 3 and 4 show the compressor stage of the turbocharger of FIG. 2 with the port of the shroud in an open position 300 and a closed position 400. Referring to FIG. 3, the air inlet 252 of the compressor housing defines an inlet flow path 260 into the compressor. The shroud 256 is positioned inside the air inlet 252 and surrounds at least a portion of the compressor wheel 240. A gap between the shroud 256 and air inlet 252 defines a bypass path 258. The port 262 in the shroud fluidically couples the inlet flow path 260 with the bypass path 258. A ring 264 is in face-sharing contact with the shroud 262. The ring is configured to move axially to adjust an orifice/restriction of the port 262. As shown in FIG. 3, the port 262 is fully open, whereby no restriction to the flow through the port is presented. As illustrated by the arrows in FIG. 3, air flows into the compressor, impinging on the blades of the compressor wheel, thus causing the air to compress and be admitted to the interior of the blower casing before eventual release to the engine. Additionally, a portion of the air flows through the port 262 and bypass path 258. The air that recirculates through the port and bypass path eventually mixes with the air flowing into the compressor. However, in some examples, during high air flow conditions, the air may instead travel through the bypass path, through the port, and then rejoin the air in the inlet flow path for compression.

The amount of air that recirculates through the port 262 is adjustable by the ring 264. The ring may be moved via a suitable actuator (e.g., electric servo, motor driven gear arrangement, or the like) upon command from a control unit (such as the controller 148 of FIG. 1), for example. The ring may be moved to fully block air flow through the port 262, as shown in FIG. 4. In other examples, the ring may be moved to partially block the port 262, thereby allowing some air flow through the port. The position of the ring may be adjusted by the controller in order to mitigate surge and increase compressor efficiency depending on operating conditions, as explained in more detail below with respect to FIG. 5. The ring may be a continuous ring with no openings or other structures and may provide a leak-tight seal around the port when the port is closed.

The port 262 may be the only port on the shroud, and as such may be sized to allow the maximum amount of air recirculation indicated to mitigate surge. (For example, it may be that the only openings to the bypass path 258 defined by the shroud are the single port 262 and the opening of the bypass path to the air inlet. Put another way, it may be the case that the port 262 is the single flow path for air that has passed downstream of the entrance to the shroud into the central interior region defined by the shroud and compressor wheel 240 ingress, other than the flow path of air drawn into the compressor by the compressor wheel or exiting the shroud the way it came in, in reverse/upstream direction.) In one example, the port 262 may have a cross-section diameter that is sized relative to the cross-section of the air inlet. For example, the cross-section diameter of the port may be in a range of 1-20% of the cross-section of the air inlet, for example the port may have a cross-sectional diameter that is 5% of the cross-sectional diameter of the air inlet. In another example, the port may be sized relative to the length of the shroud. The shroud may have a length that extends parallel to the rotational axis of the shaft of the turbocharger (which may also be parallel to a longitudinal axis of the air inlet/air intake passage coupled to the compressor) and the port may have a cross-sectional diameter comprising 1-20% of the length of the shroud, such as 10% of the length of the shroud.

The port 262 may be located on the shroud relatively close to the compressor wheel, as shown, or it may be located further from the compressor wheel (e.g., at the end of the shroud where the air first enters the shroud). In one example, the port may be positioned directly adjacent one or more blades of the compressor wheel. In another example, the shroud may be located at a position of the shroud at a certain location relative to the compressor wheel. The compressor wheel has a thickness T defined by a distance from a front surface 270 of the compressor wheel facing the air inlet to a back surface opposite 272 the front surface, and the port may be positioned at a location on the shroud corresponding to 20-25% of the distance from the front surface to the back surface, although other locations may be used without departing from the scope of this disclosure.

While a single port is illustrated in FIGS. 3 and 4, in some examples more than one port may be provided. However, the addition of extra ports may increase the complexity of the control scheme and/or increase the packaging space of the variable ported shroud. Further, while the ring has been described as being configured to move axially, it is to be understood that other ring configurations are possible, such as a ring that includes an opening corresponding to the port, where the ring is rotated to move the opening in the ring in and out of correspondence with the port. Further, in some examples, rather than using a ring to open and close the port, a flap valve or other type of valve may be used.

Turning now to FIG. 5, a method 500 for is illustrated. Method 500 may be carried out at least in part by a controller, such as controller 148 of FIG. 1, according to non-transitory instructions stored in memory of the controller, to adjust a restriction of a port on a compressor shroud, such as the port 262 of FIGS. 2-4, by actuating a ring or other valve, such as ring 264 of FIGS. 2-4.

At 502, operating parameters are determined. The operating parameters may include environmental conditions such as ambient pressure (determined based on feedback from an ambient pressure sensor), altitude (determined based on output from a GPS unit or information received from a remote computing device, for example), or other parameters. The operating parameters may also include engine operating parameters including, but not limited to, designated boost pressure, engine speed, engine load, compressor mass flow, and compressor pressure ratio. Boost pressure and engine speed may be determined based on output from respective sensors (e.g., an intake boost sensor and an engine speed sensor) while engine load may be determined based on sensor output or based on a notched throttle position or engine output (e.g., horsepower). Compressor mass flow and pressure ratio may be determined based on mass flow and pressure sensors located upstream and/or downstream of the compressor or the mass flow and pressure ratio may be estimated based on various parameters, such as engine speed, boost pressure, etc.

At 504, method 500 includes adjusting the level of port restriction based on engine operation and/or environmental conditions. This may include, at 506, opening the port when the engine/vehicle in which the shroud is installed is at altitudes above a threshold. The threshold attitude may be a fixed altitude, such as 5000 feet (e.g., 1500 meters). In other examples, the threshold altitude may change based on operating conditions, such as compressor mass flow. For example, under relatively low compressor mass flow conditions, the compressor may be more susceptible to enter surge conditions at high altitudes than when mass flow is higher, and the threshold may be increased as mass flow increases. Further, in some examples, rather than assessing altitude, ambient pressure may be assessed, and if ambient pressure is below a threshold, the port may be opened. As explained previously, the altitude may be determined based on GPS information and/or based on a geographical map location corresponding to a table look up for altitude determination.

Adjusting the level of port restriction based on engine operation and/or environmental conditions may also include, as indicated at 508, opening the port at low surge margin conditions, and as indicated at 510, closing the port at high surge margin conditions. Low surge margin conditions may include compressor operation at mass air flow and pressure ratio near a surge line of a compressor map. Under such operating conditions, relatively small decreases in mass air flow may push the compressor to surge, and thus the port may be opened to move the surge line and increase the surge margin. Conversely, if the compressor is operating at higher mass flow or lower pressure ratio, and thus risk of entering surge conditions is small, the port may be closed to increase compressor efficiency and engine power and thus lower fuel consumption.

FIG. 6 is an example compressor map 600 showing the pressure ratio across the compressor on the vertical axis, while the mass flow through the compressor is depicted on the horizontal axis. (In regards to units of measurement of the map in FIG. 6, the vertical axis is a unit-less ratio, and the horizontal axis may be air flow in kilograms per second, or (in the case of volumetric flow vs. pressure ratio) cubic meters per second, for example.)

Map 600 includes a plurality of turbocharger speed lines, for example speed line 604, which are illustrated in solid lines. For each respective speed line, optimal air flow for the turbocharger may be to the right of a surge level 602 and to the left of the choke line 603 (the boundary of which may be referred to as a choke level). The compressor may be operated within the region of optimal air flow between the surge line and the choke line. However, during certain conditions such as a transient drop in engine load, the turbocharger may respond by operating closer to the surge level 602. To increase the surge margin, the port may be opened, which shifts the surge line to the left (illustrated by the dashed line 606).

Returning to FIG. 5, adjusting the level of port restriction based on engine operation and/or environmental conditions may also include adjusting port restriction based on one or more of engine load, mass air flow, target boost pressure, or engine speed, as indicated at 512. The restriction of the port may be adjusted so that the port is fully blocked, fully open, or partially open in order to provide optimal air flow through the compressor to meet requested torque, increase compressor efficiency, and avoid surge. Further, in some examples the controller may be configured to obtain the engine operational and/or environmental information and anticipate changes to engine speed or other parameters, and preemptively control the ring position based on the anticipated changes.

Adjusting the level of port restriction based on engine operation and/or environmental conditions may also include opening the port responsive to surge, as indicated at 514. As explained previously, surge may include operation at low mass flow and/or high pressure ratio. The pressure ratio, mass air flow, and speed of the compressor may be used to determine whether the compressor is operating at or below a surge level defined by a map. For example, the control unit may include a flow map that plots pressure ratio versus mass flow for a plurality of turbocharger speeds, and the control unit may determine the minimum air flow for avoiding surge from the flow map.

If it is determined that the compressor is operating under surge conditions, the port on the shroud may be opened to a fully open position by moving the ring, in order to increase air flow recirculation through the compressor, thus increasing mass air flow through the compressor and lowering the pressure ratio, pushing compressor operation out of surge. Method 500 then returns.

Thus, as described above a turbocharger may include compressor having a variable geometry ported shroud. Based on engine operation, the compressor variable ported shroud may open to maximize the surge margin if the engine is operating in a condition where surge margin is low. The port may be closed to improve the efficiency of the compressor, resulting in better fuel economy. Depending upon the surging condition, the port may open completely, helping to rapidly overcome surge. In this way, the effective aspect ratio of the compressor may be adjusted. Additionally, the ring may have a suitable closure rate or time to get to closed that may be fixed or may be adjustable. For example, the ring may close relatively slowly when the compressor enters operation in the high surge margin conditions, to avoid any sudden air flow disturbances, but may open relatively quickly when surge is detected.

By using the variable ported shroud, the surge margin may be improved so that there is no surging phenomena during various ranges of ambient and altitude operations. For example, if the engine is operating an ambient range where surge margin is sufficiently high, the port may be closed to improve the compressor efficiency, resulting in better fuel economy of engine operations.

In doing so, surging events may be avoided in an ambient altitude range where surge is predicted to occur. Additionally, fuel consumption may be improved by closing the port if the engine is operating at a sufficiently high surge margin. Further, if the compressor starts to operate in surge, the port may be opened to overcome surging very quickly. Thus, a turbocharger including the variable geometry ported shroud described herein allows the capability to tradeoff between compressor surge margin and fuel economy based on the range of the engine operating environment. The variable geometry ported shroud provides the above benefits in a very compact design without the need for additional plumbing on the engine.

An embodiment provides a compressor system, comprising a compressor housing defining an air inlet, a shroud, and a bypass passage; a compressor wheel housed in the compressor housing and surrounded by the shroud; only a single port passing through the shroud and fluidically coupled to the bypass passage; and a ring configured to move axially to adjust a restriction of the port. The system may further include wherein the ring is in face-sharing contact with the shroud, and further comprising a controller configured to adjust a position of the ring based on one or more engine operating conditions and ambient conditions. The system may further include wherein the controller is configured to adjust the position of the ring to open the port when operating under low compressor surge margin conditions, and to adjust the position of the ring to close the port when operating under high compressor surge margin conditions. The system may further include wherein the controller is configured to adjust the position of the ring based on one or more of engine load, compressor mass flow, or target boost pressure. The system may further include wherein the controller is configured to adjust the position of the ring based on engine speed. The system may further include wherein the controller is configured to adjust the position of the ring when compressor surge is detected. The system may further include wherein the controller is configured to adjust the position of the ring to open the port when operating at altitudes above a threshold. The system may further include wherein the port is the only port on the shroud. The system may further include wherein the ring is continuous and does not include any openings. The system may further include wherein the port is located on the shroud directly adjacent the compressor wheel. The system may further include wherein the port is located on the shroud upstream of the compressor wheel.

Another embodiment provides a turbocharger system for an engine, comprising: a turbine coupled in an exhaust passage of the engine; a compressor coupled in an intake passage of the engine, the compressor rotatably coupled to the turbine and comprising: a compressor housing defining an air inlet, a shroud, and a bypass passage; a compressor wheel housed in the compressor housing and surrounded by the shroud; only a single port passing through the shroud and fluidically coupled to the bypass passage, where there are no other fluidic couplings between the air inlet and the bypass other than the single port; and a ring in face-sharing contact with the shroud and configured to move axially to open and close the port; and a controller configured to adjust a position of the ring based on engine operating conditions. The system may further include wherein the port has a cross-sectional diameter sized at a proportion of 5% relative to a cross section of the air inlet. The system may further include wherein the compressor wheel has a front surface facing the intake passage and a back surface opposite the front surface, a thickness of the compressor wheel defined by a distance from the front surface to the back surface, and wherein the port is positioned at a location on the shroud corresponding to 20% of the distance from the front surface to the back surface. The system may further include wherein the controller is configured to axially move the ring to close the port responsive to surge. The system may further include wherein the controller is configured to axially move the ring to open the port responsive operation at ambient pressure below a threshold. In an example, the turbocharger system may be included in a vehicle A further embodiment is provided for a method, comprising: flowing intake air through a compressor to generate compressed intake air for combustion in an engine; and adjusting an amount of intake air circulating through a single port of a shroud of the compressor based on an altitude at which the engine is operating. The method may further include wherein adjusting the amount of intake air circulating through the single port comprises adjusting a position of a ring coupled to the shroud. The method may further include wherein adjusting the amount of intake air circulating through the single port based on the altitude comprises opening the port when the altitude is greater than a threshold.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A compressor system, comprising:
a compressor housing defining an air inlet;
a shroud;
a bypass passage comprising a gap between the air inlet and the shroud;
a compressor wheel housed in the compressor housing and surrounded by the shroud;
only a single port on the shroud that passes through the shroud, the port being circular and having a diameter that is 1-20% of a length of the shroud, the port fluidically coupled to the bypass passage; and
a ring configured to move axially to adjust a restriction of the port.

2. The compressor system of claim 1, wherein the air inlet defines an inlet flow path to the compressor wheel and the port fluidically couples the inlet flow path to the bypass passage, wherein the ring is in face-sharing contact with the shroud on a surface of the shroud opposite the inlet flow path, and further comprising a controller configured to adjust a position of the ring based on one or more engine operating conditions and/or one or more ambient conditions, the conditions based on sensors.

3. The compressor system of claim 2, wherein the controller is configured to adjust the position of the ring to open the port when operating under low compressor surge margin conditions including compressor operation at a mass air flow and pressure ratio near a surge line of a compressor map, and to adjust the position of the ring to close the port when operating under high compressor surge margin conditions including compressor operation at a mass air flow and pressure ratio away from the surge line of the compressor map.

4. The compressor system of claim 2, wherein the controller is configured to adjust the position of the ring based on one or more of engine load, compressor mass flow, or target boost pressure.

5. The compressor system of claim 2, wherein the controller is configured to adjust the position of the ring based on engine speed.

6. The compressor system of claim 2, wherein the controller is configured to adjust the position of the ring responsive to detecting compressor surge.

7. The compressor system of claim 2, wherein the controller is configured to adjust the position of the ring to open the port responsive to operating at altitudes above a threshold.

8. The compressor system of claim 1, wherein the port is the only port on the shroud, wherein the shroud is fixedly coupled to the compressor housing, wherein the shroud is unitary at least along a cross-section taken along a plane parallel to a rotational axis of the compressor wheel, and wherein the length of the shroud extends parallel to the rotational axis.

9. The compressor system of claim 1, wherein the ring is continuous and does not include any openings, and wherein the ring forms a leak-tight seal around the port when the port is closed by the ring.

10. The compressor system of claim 1, wherein the port is located on the shroud directly adjacent the compressor wheel.

11. The compressor system of claim 1, wherein the port is located on the shroud upstream of the compressor wheel.

12. A turbocharger system for an engine, comprising:
a turbine coupled in an exhaust passage of the engine;
a compressor coupled in an intake passage of the engine, the compressor rotatably coupled to the turbine and comprising:
a compressor housing defining an air inlet, a shroud, and a bypass passage comprising a gap between the air inlet and the shroud;
a compressor wheel housed in the compressor housing and surrounded by the shroud;
only a single port passing through the shroud and fluidically coupled to the bypass passage, where there are no other fluidic couplings between the air inlet and the bypass passage other than the single port, where the single port is circular and has a diameter that is 1-20% of a length of the shroud; and
a ring in face-sharing contact with the shroud and configured to move axially to open and close the single port; and
a controller configured to adjust a position of the ring based on engine operating conditions.

13. The turbocharger system of claim 12, wherein the diameter is sized at a proportion of 5% relative to a cross-section of the air inlet.

14. The turbocharger system of claim 13, wherein the compressor wheel has a front surface facing the intake passage and a back surface opposite the front surface, a thickness of the compressor wheel defined by a distance from the front surface to the back surface, and wherein the single port is positioned at a location on the shroud corresponding to 20% of the distance from the front surface to the back surface.

15. The turbocharger system of claim 12, wherein the controller is configured to axially move the ring to close the single port responsive to surge.

16. The turbocharger system of claim 12, wherein the controller is configured to axially move the ring to open the single port responsive to operation at ambient pressure below a threshold.

17. A vehicle system, comprising:
a vehicle; and
the turbocharger system of claim 12 installed in the vehicle.

18. A method, comprising:
flowing intake air through a compressor to generate compressed intake air for combustion in an engine; and
adjusting an amount of intake air circulating through only a single port of a shroud of the compressor based on an altitude at which the engine is operating, where the single port is circular and has a diameter that is 1-20% of a length of the shroud.

19. The method of claim 18, wherein adjusting the amount of intake air circulating through the single port comprises adjusting a position of a ring coupled to the shroud.

20. The method of claim 18, wherein adjusting the amount of intake air circulating through the single port based on the altitude comprises opening the single port when the altitude is greater than a threshold.

* * * * *